United States Patent [19]

Jefrey

[11] Patent Number: 5,727,767
[45] Date of Patent: Mar. 17, 1998

[54] MOBILE HOME SUPPORT STAND

[76] Inventor: Lester G. Jefrey, 2640 Humboldt Rd., Green Bay, Wis. 54311

[21] Appl. No.: 629,182

[22] Filed: Apr. 8, 1996

[51] Int. Cl.⁶ .................................................. A47F 5/00
[52] U.S. Cl. ............................................ 248/354.3
[58] Field of Search ............... 248/346.01, 346.05, 248/346.06, 351, 352, 354.1, 354.3, 354.4; 254/45

[56] References Cited

U.S. PATENT DOCUMENTS

| | | | |
|---|---|---|---|
| 2,454,179 | 11/1948 | C. Hudkins | 248/354.1 |
| 3,222,030 | 12/1965 | W. J. Thorpe | 248/354.3 |
| 3,580,599 | 5/1971 | Dodgen | 280/34 |
| 3,614,064 | 10/1971 | Bennett | 254/86 R |
| 3,713,259 | 1/1973 | Tkach | 51/111 |
| 4,014,517 | 3/1977 | Keagle | 254/45 |
| 4,084,789 | 4/1978 | Francis | 254/86 R |
| 4,216,939 | 8/1980 | Valdespino | 254/45 |
| 4,684,097 | 8/1987 | Cox | 248/354.3 |
| 4,895,335 | 1/1990 | Oliver | 248/354.3 |

*Primary Examiner*—Ramon O. Ramirez
*Attorney, Agent, or Firm*—Recka & Joannes; Joseph M. Recka

[57] ABSTRACT

An adjustable support stand is disclosed for permanently supporting a mobile home above the ground. The support stand includes means for leveling the structure during initial instillation and also after the mobile home has become established. Further, means is provided whereby the stand is mechanically secured to a supporting foundation and also to the structure of the modular home thereby protecting against tip-over in the event of high winds and/or earth vibrations.

7 Claims, 5 Drawing Sheets

MOBILE HOME SUPPORT STAND

BACKGROUND OF THE INVENTION

1. Field of the Invention

The present invention relates to modular housing units of the type known as mobile homes. Such homes are typically manufactured off site on an assembly line and, having wheel and axle assemblies attached thereto, are towed over the road to a permanent residential site.

In the past such mobile homes have been typically positioned, on site, by temporarily supporting and leveling the unit upon hydraulic jacks and after placing supporting concrete blocks and wooden shims under the structure the hydraulic jacks would be removed. Because of shifting and settling soil the mobile home would eventually shift requiring a repeat of the leveling process.

Further homes installed in this manner relied upon the weight of the mobile home, resting upon the concrete block supports, to keep the unit in place. However, because of the large flat floor surface of the mobile home elevated above the ground, strong winds often lift or move the mobile home from its supporting foundation. To solve this problem, steel straps have been placed over top of many mobile homes and anchored to the ground, on either side of the mobil home, with screw-anchors physically screwed into the earth. Depending upon the local soil composition and condition, it is not unusual for such screw-anchors to be pulled out of the ground when large forces are applied thereto.

Therefore, it is desirable to provide a more suitable means by which a modular home may be leveled and secured to a permanent supporting foundation so that high winds and possible earth vibrations do not lift, move, or otherwise upset the modular home from its supports.

2. Description of the Prior Art

U.S. Pat. No. 4,014,517, for a "Variable Height Stand," issued to Walter S. Keagle on Mar. 29, 1977 teaches a mobile home support stand consisting of a generally flat base resting upon the ground and having two pairs of diametrically opposed, vertically converging, variable length, legs each hingedly attached to an elevated support platform which supportingly engages a structural member of the mobile home thereon. Each leg is slidingly attached to the base such that movement of the leg pairs toward or away from each other raises or lowers the support platform. Once the Keagle support stand is positioned under a suitable structural member of the mobile home the leg pairs are moved to a position whereby the support platform supportingly engages the mobile home structure. The leg pairs are secured to the base by securement means.

U.S. Pat. No. 4,084,789, for a "Stabilizing Jack," issued to Melvin A. Francis on Apr. 18, 1978 teaches a manually operated mechanical stabilizing jack that is permanently attached to the four corners of a mobile recreational vehicle for stabilizing the vehicle when parked. The stabilizing jacks are hingedly attached to the vehicle such that they may be retracted when not in use.

U.S. Pat. No. 3,614,064, for a "Stabilizing Jack Structure for a Mobile Vehicle," issued to Winton J. Bennett on Oct. 19, 1971 also teaches a manually operated mechanical stabilizing jack hingedly attached to a mobile recreational vehicle for stabilizing the vehicle when parked. The stabilizing jack also includes means whereby it may be retracted when not in use.

U.S. Pat. No. 4,216,939, for a "recreational Vehicle Leveling and Support System," issued to Joseph M. Valdespino on Aug. 12, 1980 teaches a system of hydraulicly operated stabilizing jacks attached to the four corners of a mobile recreational vehicle for stabilizing the vehicle when parked. The hydraulic jacks are operated from one central location consisting of a manually operated hydraulic pump supplying hydraulic fluid, under pressure, to a distribution manifold that supplies the fluid to each stabilizing jack whereby the vehicle may be supported and leveled from a single control point. The stabilizing jacks are retracted when not in use.

U.S. Pat. No. 3,580,599, for a "Jack and Tie down System for a Vehicle Mounted Camper," issued to John N. Dodgen on May 25, 1971 relates to a slide-in camper commonly used with a pick-up type truck wherein the camper slides into the truck bed. Dodgen teaches a combination camper stabilizing jack, for use in stabilizing the camper when parked, and also serving as a hold down device which secures the camper to the truck bed when traveling over the highway.

All of the prior art discussed above, except for the Keagle patent, relates to leveling devices for use on mobile recreational vehicles on a temporary basis. They are not intended for, nor are they suitable for, permanent, long term applications as in the case of modular homes.

Although the Keagle patent discloses support stands for use with permanent modular home installations they are cumbersome to adjust and require that the structure be independently supported while the stands are being installed. Also the Keagle stand is not easily adjusted once the modular home is finally erected. Further the Keagle stand does not secure or otherwise anchor the modular home structure to the ground to prevent tip-overs in high wind conditions.

SUMMARY OF THE PRESENT INVENTION

The present invention overcomes the short comings of the prior art by providing a modular home support stand that is easy to adjust when leveling the structure, not only upon initial installation but also after the modular home is in place. Further the present invention provides for securement of the modular home firmly to the ground thereby preventing tip-over in high wind conditions and/or as the result of earth vibrations.

My new and improved modular home support stand comprises a vertically extending, cylindrical steel post affixed to a flat base plate which is secured to a foundation such as a concrete pad or concrete piers. A hold-down assembly, comprising a pair of diametrically opposed clamping plates telescopingly attached to the post, is secured to a structural member of the modular home. Thus when installed the modular home structure is secured to the foundation thereby preventing tip-overs in high wind conditions and/or as the result of earth vibrations.

My support stand further includes an integral "screw-jack" apparatus for leveling the modular home not only upon initial installation, but also after the modular home is established. The screw-jack apparatus comprises a threaded support stud threadingly received within the support post. Thus the modular home is easily leveled not only when originally installed, but may also be easily adjusted after the modular home has become established.

DETAILED DESCRIPTION OF THE INVENTION

Figure 1:
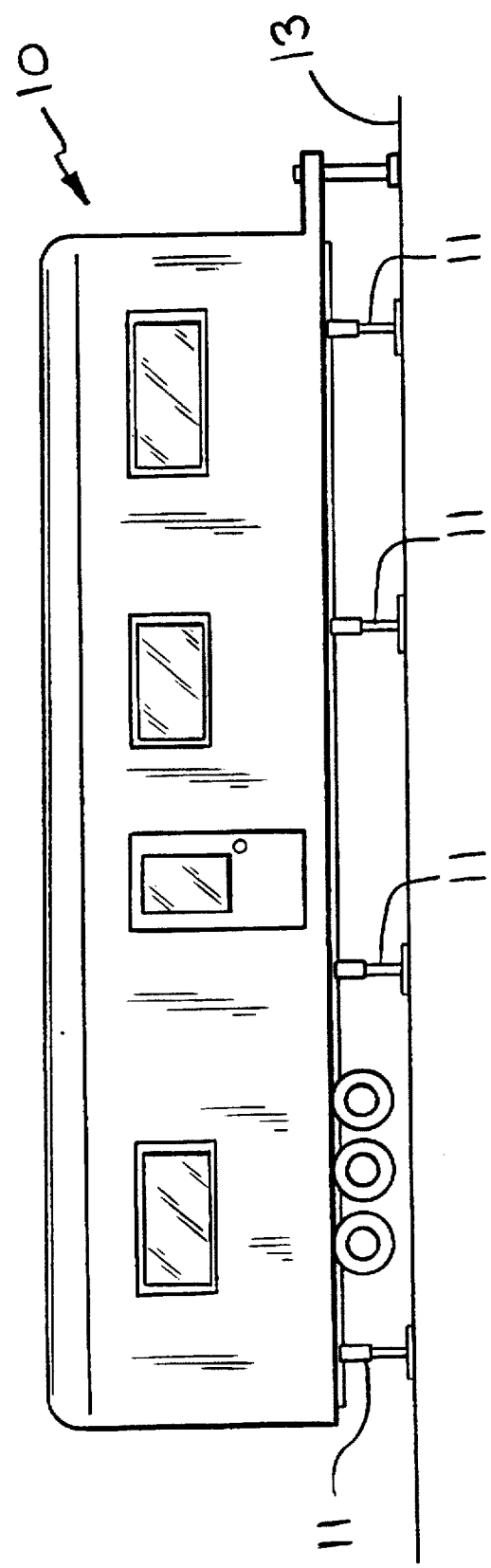
FIG. 1 presents a side elevational view of a typical mobile home supported and secured by a plurality of my hold-down devices.

FIG. 1 illustrates a typical modular home 10 permanently supported upon a multiplicity of my new leveling and hold down support stands 11.

Figure 2:
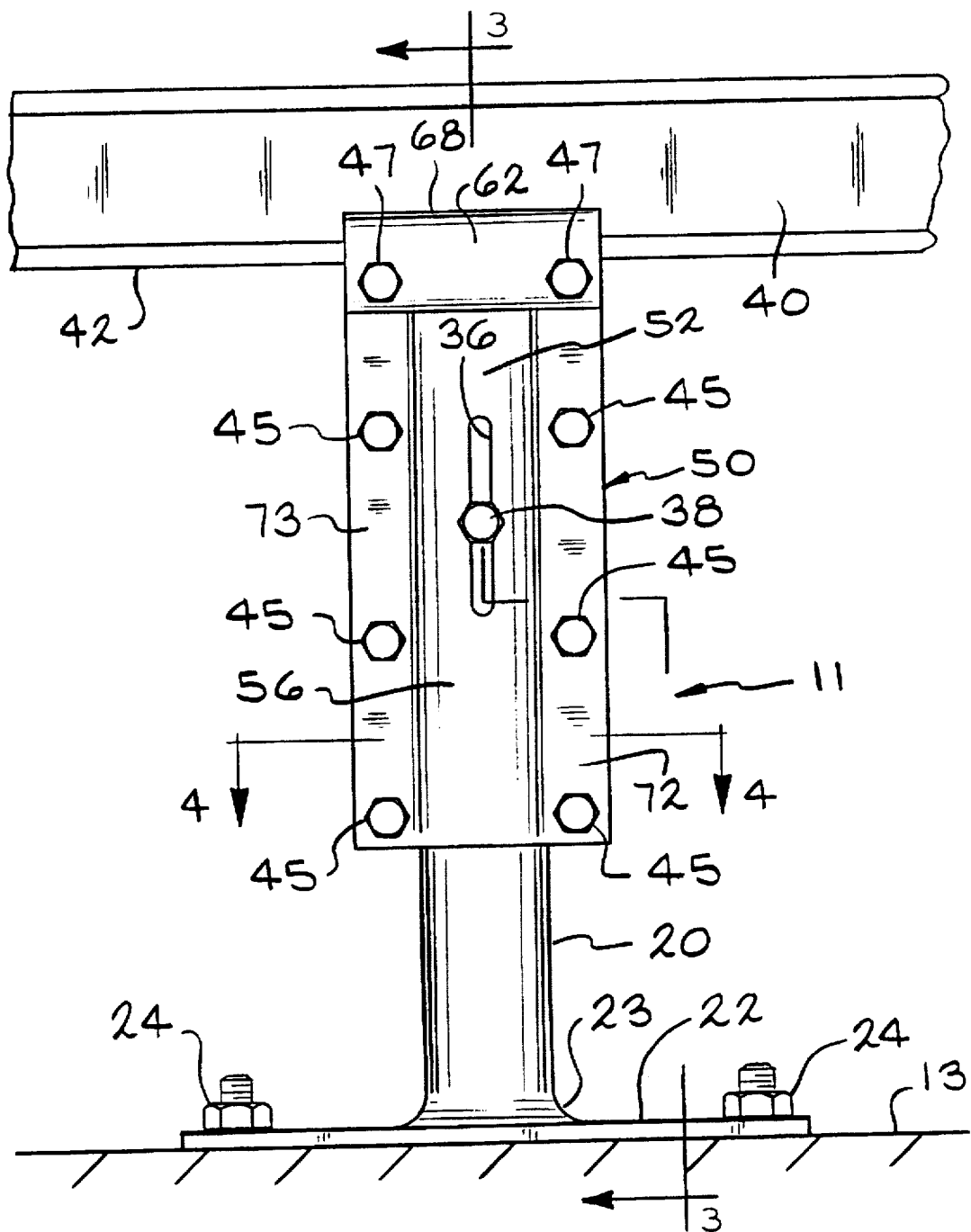
FIG. 2 presents a front elevational view of a single hold-down device attached to a structural member of the mobile home shown in FIG. 1.
Figure 3:
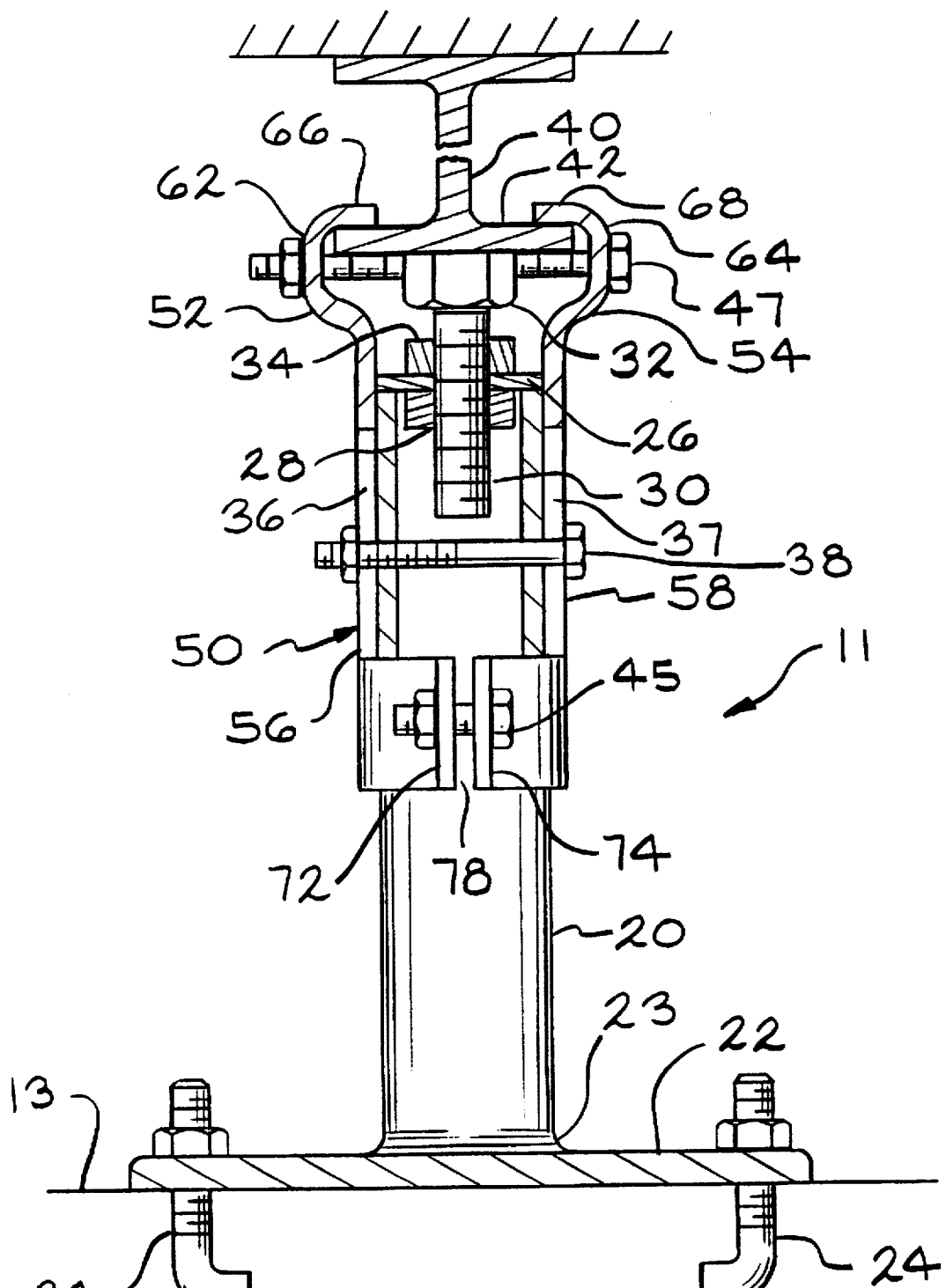
FIG. 3 presents a partial crossectional view taken along line 3—3 in FIG. 2.
Figure 4:
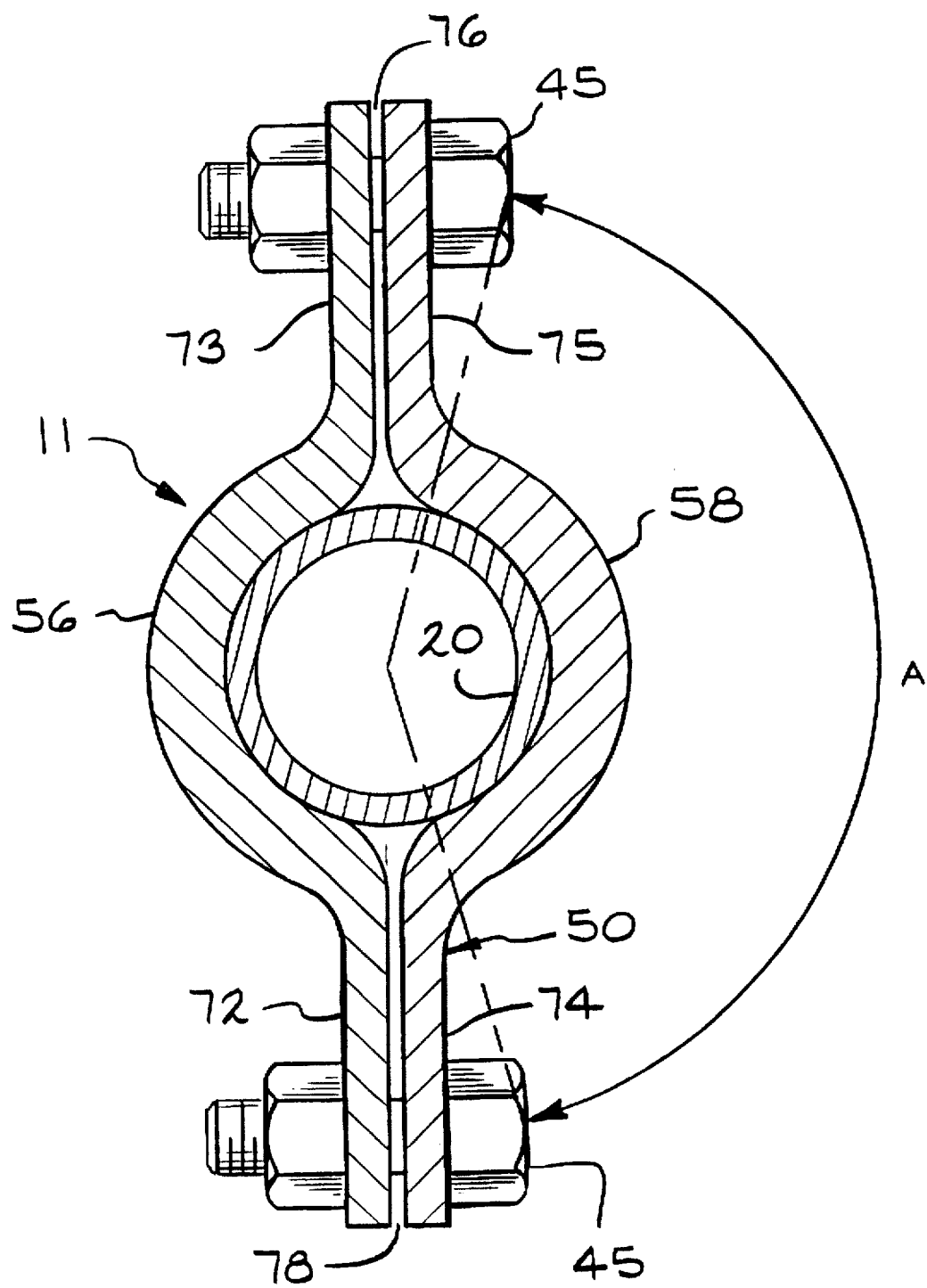
FIG. 4 presents a crossectional view taken along line 4—4 in FIG. 2.
Figure 5:
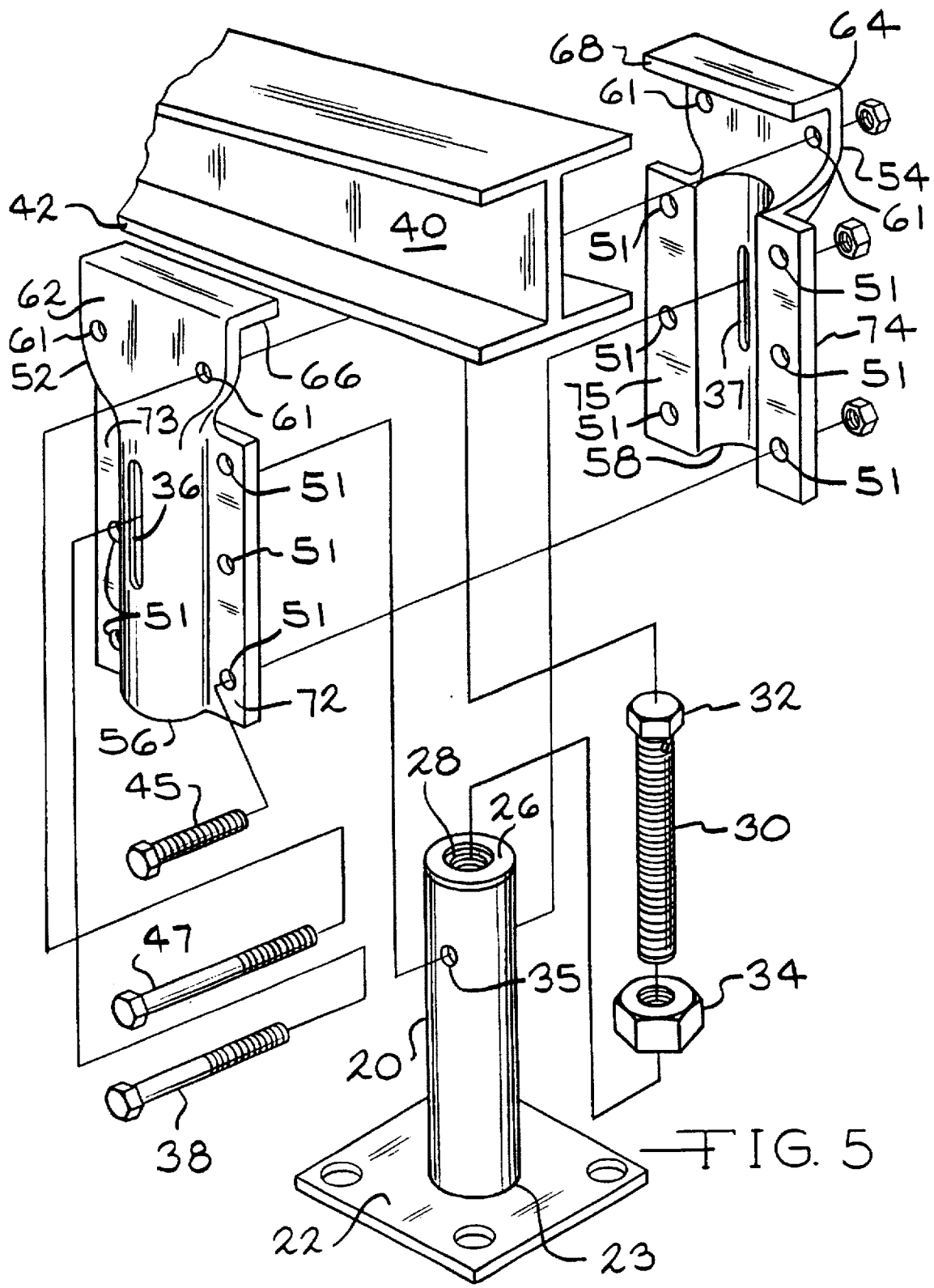
FIG. 5 presents an exploded pictorial view of my holddown device showing the general configuration and arrangement of parts thereof.

Referring to FIGS. 2 through 5, hold-down stands 11 generally comprises a vertically extending cylindrical steel post 20 affixed to a generally flat, steel base plate 22 by weld 23 or any other suitable means. Base plate 22 is secured to a concrete slab or pier 13 by anchor bolts 24, preferably located in the general proximity of each corner of plate 22 as illustrated in FIGS. 2, 3, and 5. Although my preferred embodiment described herein comprises steel post 20 welded to base plate 22, one might also, in the alternative, use a one piece casting for this assembly. Also one might embed plate 22, or some equivalent anchoring means therefore, within the concrete pad or pier if so desired.

Affixed to the open end of post 20 is end plate 26 having a threaded bore 28 therethrough as best seen in FIG. 3. Received within threaded bore 28 is threaded support stud 30 having a typical hexagonal head 32. It is preferable to further provide a hexagonally shaped locking nut 34 threaded upon stud 30 and positioned above end plate 26. The function of locking nut 34 will be further described below.

At this point I will describe the leveling feature of my hold-down stand. Referring principally to FIG. 3, post 20 is aligned and positioned directly beneath a typical floor supporting and longitudinally extending I beam 40 of modular home 10. Support stud 30 is rotatingly extended vertically until head 32 engages the bottom of flange 42 of I beam 40. The support studs of all stands may then be individually adjusted to level modular home 10. Once modular home 10 is leveled, locking nut 34 (on all support stands) is rotated so as to bear against end plate 26 thereby locking support stud 30 in its extended position.

Returning to FIGS. 2 through 5, hold down assembly 50 comprises diametrically opposed clamping plates 52 and 54. Each clamping plate is configured with semicircular lower portions 56 and 58 having an inside radius approximating the outside radius of post 20 such that semicircular portions 52 and 54 may each frictionally engage post 20 throughout a preferred included angle A of approximately 150 degrees as best illustrated in FIG. 4.

The upper portions 62 and 64, of clamping plates 52 and 54 respectively, are configured with inwardly extending flanges 66 and 68. When clamping plates 52 and 54 are assembled upon post 20, as illustrated in FIGS. 3 and 4, flanges 66 and 68 are positioned so as to extend inwardly of I beam flange 42 in an engaging fashion as best illustrated in FIG. 3.

Clamping plates 52 and 54 are further provided with ears 72, 73, 74, and 75 extending radially outward from the lower curved portions 56 and 58 as best illustrated in FIG. 4. Ears 72, 73, 74, and 75 include appropriately spaced and aligned holes 51 therethrough for receiving nut and bolt fasteners 45 for fictionally affixing clamping plates 52 and 54 to post 20 as seen in FIGS. 3 and 4. It is preferred that, when clamping plates 52 and 54 are assembled upon post 20, a gap 76 and 78 be provided therebetween so that the maximum clamping force, about post 20, may be obtained by securing nut and bolt fasteners 45.

It is also preferred in the upper portions 62 and 64 of clamping plates 52 and 54 to provide for nut and bolt assemblies 47 on either side of support stud 30 and extending through holes 61 of upper portions 62 and 64, as illustrated in FIGS. 3 and 5, thereby assuring that flanges 66 an 68, of upper portions 62 and 64, are securely attached to flange 42 of I beam 40.

Although it is believed that the frictional engagement between post 20 and hold down assembly 50 is sufficient to retain mobile home 10 in place under normal conditions, one may also provide an aperture 35 through post 20 aligned with slots 36 and 37 within plates 52 and 54 respectively for receipt of a safety pin such as nut and bolt assembly 38 therethrough. In the event hold down assembly 50 should tend to slip upward on post 20, under extreme conditions, slots 36 and 37 will limit the amount of slippage between post 20 and hold down assembly 50 and prevent hold down assembly 50 from ever sliding off post 20. The length of slots 36 and 37 would limit the amount of permissible movement between post 20 and hold down assembly 50.

In accordance with the provisions of the patent statutes, the principle and mode of operation of my invention has been illustrated and described in what is considered to represent its preferred embodiment. However, it should be understood that the invention can be practiced otherwise than as specifically illustrated and described without departing from its spirit or scope.

I claim:

1. Apparatus for supporting a modular home comprising:
   a) a foundation;
   b) support means affixed to said foundation for supporting upon said support means said modular home;
   c) means for securing said modular home to said support means, wherein said means for securing said modular home to said support means includes a pair of oppositely opposed clamping plates, one on either side of said support post, and means for securing said plates to said post, said plates being secured to said modular home;

wherein said support post includes a cylindrical portion thereof and said clamping plates include an arcuately configured portion thereof that frictionally engages the outer peripheral surface of said support post cylindrical portion, said clamping plates further including means for squeezing said support post therebetween.

2. The apparatus as claimed in claim 1 wherein said arcuately configured portion of said clamping plates includes an included angle between 90 degrees and 180 degrees.

3. The apparatus as claimed in claim 1 wherein said included angle is 150 degrees.

4. The apparatus as claimed in claim 1 including pin means extending through said support post and said clamping plates thereby mechanically affixing said plates to said post.

5. A mobile home support and hold down device for securing said mobile home to the ground comprising:
   a) a base,
   b) means for securing said base to said ground,
   c) a vertically extending support post affixed to said base, said post including a vertically aligned threaded bore at its top end, d) a threaded support stud within said threaded bore for supporting thereupon a structural member of said mobile home whereby rotation of said stud causes said stud to traverse outward or inward of said threaded bore thereby raising or lowering said mobile home, e) means for locking said support stud in a selected position, f) means for affixing said mobile home to said support post wherein said support post includes a cylindrical portion and said clamping plates include an arcuately configured portion that frictionally engages the outer peripheral surface of said support post cylindrical portion, said clamping plates further including means for squeezing said support post therebetween.

6. The apparatus as claimed in claim 5 wherein said arcuately configured portion of said clamping plates includes an included angle between 90 degrees and 180 degrees.

7. The apparatus as claimed in claim 6 wherein said included angle is 150 degrees.

* * * * *